(12) United States Patent
Rowe

(10) Patent No.: US 10,721,909 B1
(45) Date of Patent: Jul. 28, 2020

(54) ANIMAL CRATE AND CRATE COVER ASSEMBLY

(71) Applicant: Bryant T. Rowe, Orange Park, FL (US)

(72) Inventor: Bryant T. Rowe, Orange Park, FL (US)

( * ) Notice: Subject to any disclaimer, the term of this patent is extended or adjusted under 35 U.S.C. 154(b) by 315 days.

(21) Appl. No.: 15/355,132

(22) Filed: Nov. 18, 2016

Related U.S. Application Data

(60) Provisional application No. 62/256,787, filed on Nov. 18, 2015.

(51) Int. Cl.
*A01K 1/00* (2006.01)
*A01K 1/02* (2006.01)

(52) U.S. Cl.
CPC .................. *A01K 1/0245* (2013.01)

(58) Field of Classification Search
CPC ...... A01K 1/00; A01K 1/0005; A01K 1/0035; A01K 1/03
USPC .......... 452/452, 470, 480, 496, 497
See application file for complete search history.

(56) References Cited

U.S. PATENT DOCUMENTS

| | | | | |
|---|---|---|---|---|
| 4,286,612 A * | 9/1981 | Neal | ...................... | A01K 1/033 135/115 |
| 4,484,540 A | 11/1984 | Yamamoto | | |
| 5,178,100 A * | 1/1993 | Monk | ................... | A01K 1/0125 119/168 |
| 5,881,678 A * | 3/1999 | Morley | ................. | A01K 1/0236 119/496 |
| 6,446,577 B1 * | 9/2002 | Salahor | ................ | A01K 1/0254 119/470 |
| 6,581,545 B1 | 6/2003 | Foster | | |
| 6,758,167 B1 * | 7/2004 | Edelinski | ............... | A01K 1/033 119/498 |
| 7,044,083 B2 * | 5/2006 | Farmer | ................ | A01K 1/0254 119/474 |
| 7,127,753 B1 * | 10/2006 | Ramaley | ................ | A47G 9/086 5/413 R |
| 7,380,521 B2 * | 6/2008 | Morton | ................ | A01K 1/0245 119/499 |
| 7,766,180 B2 | 8/2010 | Mansouri et al. | | |
| 7,789,044 B2 * | 9/2010 | McGrade | ............. | A01K 1/0254 119/496 |
| 8,336,497 B2 | 12/2012 | van Zuilekom | | |
| 8,365,752 B1 * | 2/2013 | Fortin | .................. | A61N 5/0614 135/115 |

(Continued)

OTHER PUBLICATIONS https://www.amazon.com/ask/questions/asin/B01BL62EUU/ref=ask mdp dpmw ql hza?isAnswered=true.*

*Primary Examiner* — Richard T Price, Jr.
(74) *Attorney, Agent, or Firm* — John Rizvi; John Rizvi, P.A.

(57) ABSTRACT

An animal crate and crate cover assembly is disclosed, including an animal crate and a foldable crate cover which can be placed over the animal crate. The foldable crate cover includes a four panel assembly having a top panel for covering a top of the animal crate, two side panels for covering left and right sides of the animal crate, and a back panel for covering a back of the animal crate. The top panel is connected to the two side panels and the back panel in a foldable way. The side panels and the back panel can have fasteners for fastening the side panels and the back panel together after the foldable crate cover being placed over the animal crate.

16 Claims, 5 Drawing Sheets

(56) References Cited

U.S. PATENT DOCUMENTS

| | | | |
|---|---|---|---|
| 8,985,058 B2* | 3/2015 | Cantwell | A01K 1/0245 |
| | | | 119/474 |
| 9,596,826 B2* | 3/2017 | Lu | A01K 1/033 |
| D804,738 S * | 12/2017 | Nourollah | D30/109 |
| 2004/0194723 A1* | 10/2004 | Farmer | A01K 1/0254 |
| | | | 119/474 |
| 2006/0027582 A1 | 2/2006 | Beach | |
| 2009/0008005 A1 | 1/2009 | Chu | |
| 2010/0242856 A1* | 9/2010 | Willard | A01K 1/033 |
| | | | 119/499 |
| 2011/0290193 A1 | 12/2011 | Peregoy | |

* cited by examiner

ANIMAL CRATE AND CRATE COVER ASSEMBLY

CROSS-REFERENCE TO RELATED APPLICATIONS

This application claims the benefit of U.S. Provisional Patent Application Ser. No. 62/256,787, filed Nov. 18, 2015, which is incorporated by reference herein in its entirety.

FIELD OF THE INVENTION

The present invention relates generally to pet accessories, and more particularly, to an animal crate and crate cover assembly including a foldable animal crate cover which can be placed over a pet or other animal crate to provide a den-like environment and which can be easily and cost-effectively stored, transported, and packaged.

BACKGROUND OF THE INVENTION

Pet transport systems have been around for many years. The two main types of pet transport systems are pet carriers, which are typically used for smaller animals, and pet or animal crates, which are more suitable for larger pets or animals. Pet carriers are typically enclosed to give the pet an environment with some privacy which allows them a feeling of security. There are hundreds of different models of pet carriers competing on the market. Most are rectangular-shaped with a door that swings out to allow entry, exit or access to the pet. These are usually used for cats or small dogs. Some pet carriers are rigid, while others are flexible.

Pet or other animal crates are larger and can therefore accommodate bigger dogs or other animals that are unable to fit into a smaller pet carrier. They are typically rectangular, with most of them being made of wire. They have swinging or sliding doors that allow access to the pet. Some crates may have two or three doors to make access easier from different sides. Crates may also be collapsible for easy storage once the pet or other animal is no longer inside. Crates can be constructed of metal, mesh, plastic, microfiber or nylon.

Each type of material of the crates has its advantages and disadvantages. Metal or wire crates typically have spaces between the bars and are ideal for hot and humid climates, since they allow greater ventilation. They are also good for animals that are more curious about their surroundings and want to see what is going on around them. Wire crates can be collapsible, which facilitates storage. Wire crates are also easier to clean than other types of crates. However, wire crates do not provide an enclosed, den-like environment many pets would enjoy.

Solid plastic crates are good for animals that prefer an enclosed environment and may become nervous with all the excitement travel can bring. Solid plastic crates can also be used for airline travel, as the airlines require solid plastic crates. However, solid plastic crates do not allow for good ventilation and do not allow pets to see the surroundings.

Soft-sided crates made of microfiber and nylon are good for calmer dogs or animals who won't jump around and roll the crate on its side, and who like to be shielded from the outside environment. Soft-sided crates are also lighter than the other types of crates and thus make it easier to carry them around. However, due to their solid, one-piece construction, generally made from materials that can "grab" contaminants, soft-sided crates are more difficult to clean. They cannot be deconstructed to clean each area easily, and dirt, hair and germs can attach to them, unlike a wire crate.

It is theorized that dogs and many other animals are genetically predisposed to being in a den, or a small, well-defined space. A dog can feel safe in such an area. Therefore, dogs and other animals prefer to be enclosed and isolated at times, to give them a sense of security. This may well be better-achieved by the solid type crates that offer no exposure to the outside environment. However, as stated before, these are difficult to clean and may therefore become unappealing to the animal after a while. Perhaps a better idea would be a wire crate that can somehow be covered up, giving the animal the security it craves, and yet allowing the pet owner to easily clean the crate.

The current crate covers on the market include products made of fabric materials that can cover the top and a couple of sides. These products are similar to bedspreads and can be folded and rolled for storage and transportation, and washed to remove soiling or germs. The fabrics can come in a variety of patterns so they can match different decors. They can come in different preconfigured shapes and sizes, or can be custom made per individual specifications. However, fabrics are prone to holding dirt, hair and gems and are not easy to ventilate, thus requiring frequent cleaning. Fabric covers are also quite expensive.

Accordingly, there is an established need for an animal crate and crate cover assembly that can solve at least one of the aforementioned problems.

SUMMARY OF THE INVENTION

The present invention is directed to an animal crate and crate cover assembly, comprising an animal or pet crate, and a simple and cost effective foldable crate cover that can be easily placed over the animal crate to cover the animal crate. The foldable crate cover can be easily and cost-effectively packaged, stored and transported, and can be easy to clean and can stay clean longer. The foldable crate cover consists of a four panel assembly which can be folded to cover top, left, right and back sides of an animal crate. The four panels can be integrally formed with hinge sections between adjacent panels or, alternatively, connected to one another by hinges, flexible connectors or any applicable articulated connector which allows adjacent panels to fold relative to one another. The panels can be made of plastic, wood, cardboard, lightweight metal or combinations thereof, for instance and without limitation. Since the crate cover of the present invention is formed of flat panels in a foldable arrangement, the crate cover can be easily and cost-effectively stored, transported and packaged. In addition, since the panels are flat, they can be provided with a myriad of decorative elements using printing or other decorating techniques, at reasonable cost. Sellers (e.g., a pet store) could personalize the crate cover panels to include their names, logos, and brand colors.

In a first implementation of the invention, an animal crate and crate cover assembly includes an animal crate for housing an animal therein, and a foldable crate cover. The animal crate includes a top side, a left side, a right side, a front side and a back side. In turn, the foldable crate cover includes a panel assembly having a top panel for covering the top side of the animal crate at least partially, two side panels for covering the left and right sides of the animal crate at least partially, and a back panel for covering the back side of the animal crate at least partially. The two side panels and the back panel are foldably connected to the top panel. The foldable crate cover can adopt a folded configuration in which the two side panels and back panel are folded relative to the top panel to define an inner space for receiving the animal crate therein.

In a second aspect, the foldable crate cover can include a front opening and a bottom opening in communication with the inner space when the crate cover is in the folded configuration. In some embodiments, the bottom opening can be configured to allow the insertion and removal of the animal crate therethrough, into and from the inner space, respectively. Alternatively or additionally, the front opening can be configured to allow the insertion and removal of the animal crate therethrough, into and from the inner space, respectively.

In another aspect, the foldable crate cover can further adopt a flat configuration in which the two side panels, the back panel and the top panel are arranged coplanar to one another, to facilitate storage and transportation of the foldable crate cover.

In another aspect, at least one of the two side panels and back panel of the panel assembly can be foldably connected to the top panel by a hinge section. The hinge section can include a hinge, a flexible connecting strap, a scored fold line or combinations thereof.

In another aspect, the side panels and back panel of the panel assembly can be foldably connected to the top panel by respective hinge sections arranged at opposite left and right sides and a rear side of the top panel, respectively.

In yet another aspect, the animal crate and crate cover assembly can further include at least one fastener for securing at least one of the side panels of the panel assembly to the back panel of the panel assembly when the foldable crate cover is arranged in the folded configuration. In some embodiments, the at least one fastener can be selectively and reversibly fastened and unfastened. Alternatively or additionally, the at least one fastener can include a first fastener portion carried by the at least one of the side panels and a second fastener portion carried by the back panel, the first and second fastener portions configured to fasten to one another when the foldable crate cover is arranged in the folded configuration. In some embodiments, the first and second fastener portions can be mating hook and loop portions of a hook-and-loop fastener.

In another aspect, fasteners can be provided on the two side panels of the panel assembly, configured to fasten to corresponding one or more fasteners on the back panel of the panel assembly when the foldable crate cover is arranged in the folded configuration.

In yet another aspect, any one of the side panels and back panel can be made of plastic, wood, cardboard, lightweight metal or combinations thereof.

In another aspect, any one of the side panels and back panel comprises a decorative element visible from outside the foldable crate cover when the foldable crate cover is arranged in the folded configuration.

In another aspect, wherein the animal crate can be a wire crate.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an animal and crate cover assembly comprising a convenient and cost effective foldable crate cover. The foldable crate cover is capable of being easily placed over a wire animal crate or other ventilated, relatively open animal crate to cover the animal crate. The foldable crate cover can be easily cleaned and stored.

Figure 1:
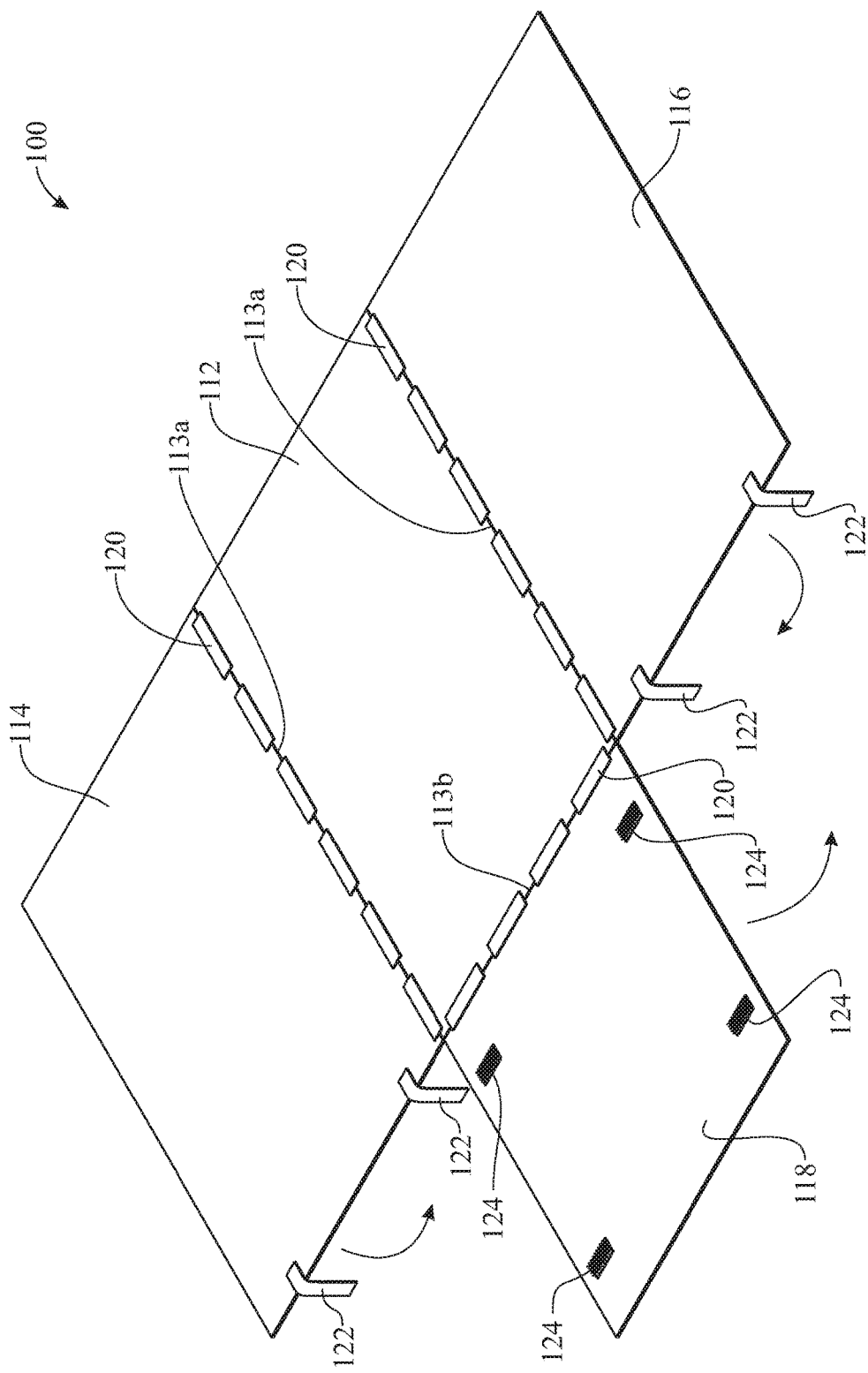
FIG. 1 presents an isometric view of a crate cover in accordance with an exemplary embodiment of the present invention, the crate cover shown unfolded.

Referring initially to FIG. 1, a foldable crate cover 100 is illustrated in accordance with an exemplary embodiment of the present invention. As shown, the foldable crate cover 100 consists of a four-panel assembly which includes a top panel 112, two side panels 114 and 116 extending from opposite left and right sides 113a of the top panel 112, and a back panel 118 extending from a rear side 113b of the top panel 112 (the rear side 113b of the top panel 112 arranged extending between said opposite left and right sides 113a of the top panel 112). The top panel 112 is connected to the two side panels 114 and 116 and the back panel 118 in a foldable way, so that the panels 112, 114, 116 and 118 can be folded to adopt a three-dimensional configuration or body comprising an inner space 130, shown in FIG. 4. With continued reference to FIG. 1, the panels 112, 114, 116, and 118 can be integrally formed with hinge sections 120 between the top panel 112 and the other panels 114, 116, and 118. The hinge sections 120 can take various alternative forms. For instance, the hinge sections 120 of the present embodiment are formed as flexible connecting straps affixed to adjacent edges of the panels, the hinge sections 120 being preferably integrally formed with the panels. In other embodiments, the panels can be formed in material continuation, and the hinge sections 120 can be scored fold lines formed between the panels. Alternatively, the panels 112, 114, 116, and 118 can be connected to one another by hinges, flexible connectors or any applicable articulated connector which is attached to adjacent panels and allows adjacent panels to rotate relative to one another.

The panels 112, 114, 116, and 118 can be flat panels and can be made of plastic, wood, cardboard, lightweight metal or combinations thereof, for instance and without limitation. Since the foldable crate cover 100 is formed of flat panels in foldable relationship with one another, the product can be easily and cost-effectively stored, transported and packaged in a flat configuration as shown in FIG. 1. In addition, since the panels 112, 114, 116, and 118 are flat, they can be provided with a myriad of decorative elements using printing or other decorating techniques, at reasonable cost. Sellers (e.g., a pet store) could personalize the panel product to include their names, logos, and brand colors.

The side panels 114 and 116 and the back panel 118 can have fasteners for fastening the side panels 114 and 116 and the back panel 118 together after the foldable crate cover 100 has been placed over an animal crate. The fasteners can be any openable and closable fasteners, which can be opened and closed reversibly and repeatedly. For example, as shown in FIG. 1, the fasteners can be hook-and-loop fasteners, each having a first hook-and-loop component 122 attached to the side panels 114 and 116 and a second hook-and-loop component 124 attached to the back panel 118. The fasteners can be easily closed or opened by attaching the first hook-and-loop component 122 and the second hook-and-loop component 124 together or detaching the first hook-and-loop component 122 and the second hook-and-loop component 124 from each other.

Figure 2:
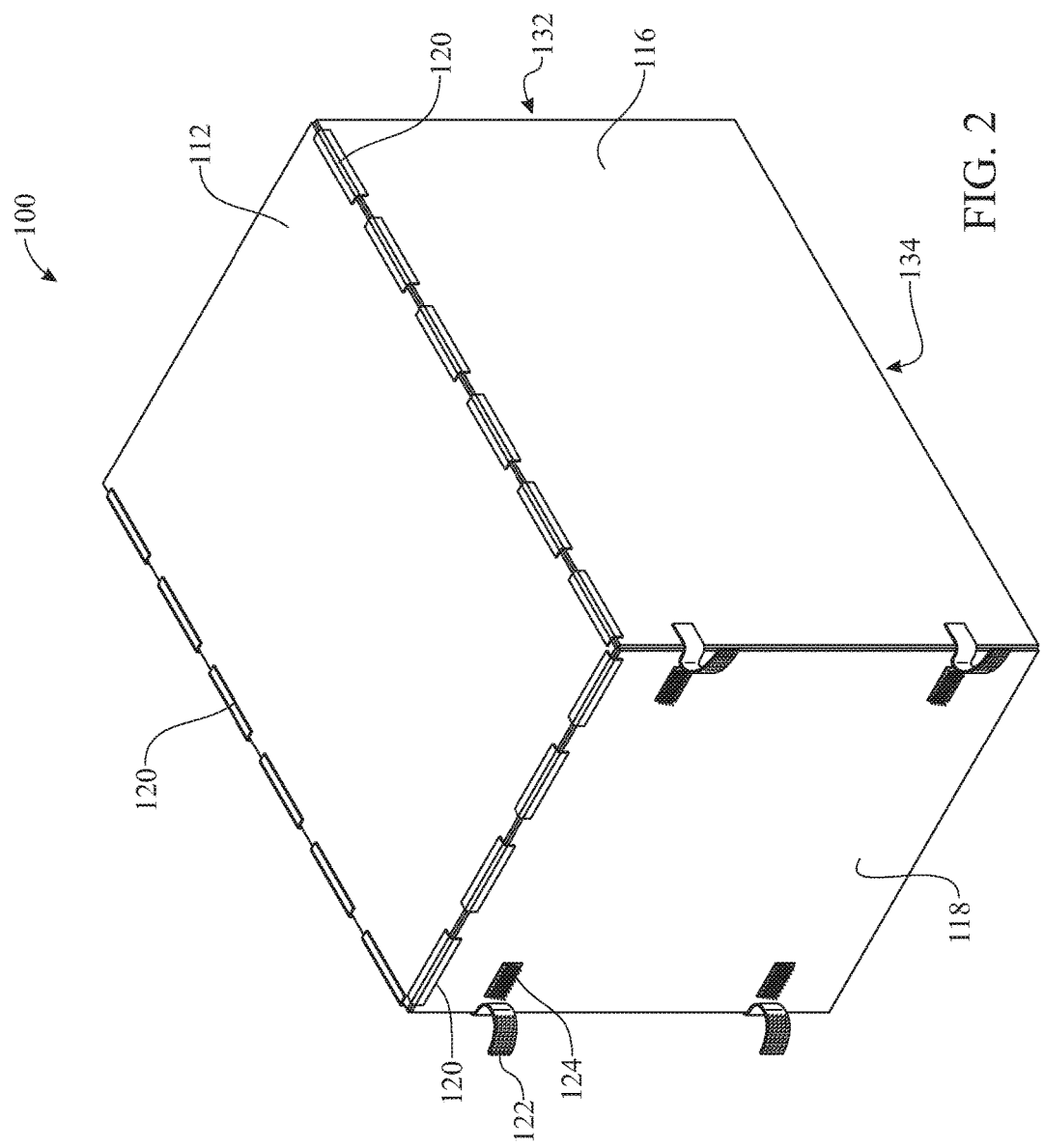
FIG. 2 presents an isometric view of the crate cover, shown folded and with the side fasteners unfastened.
Figure 3:
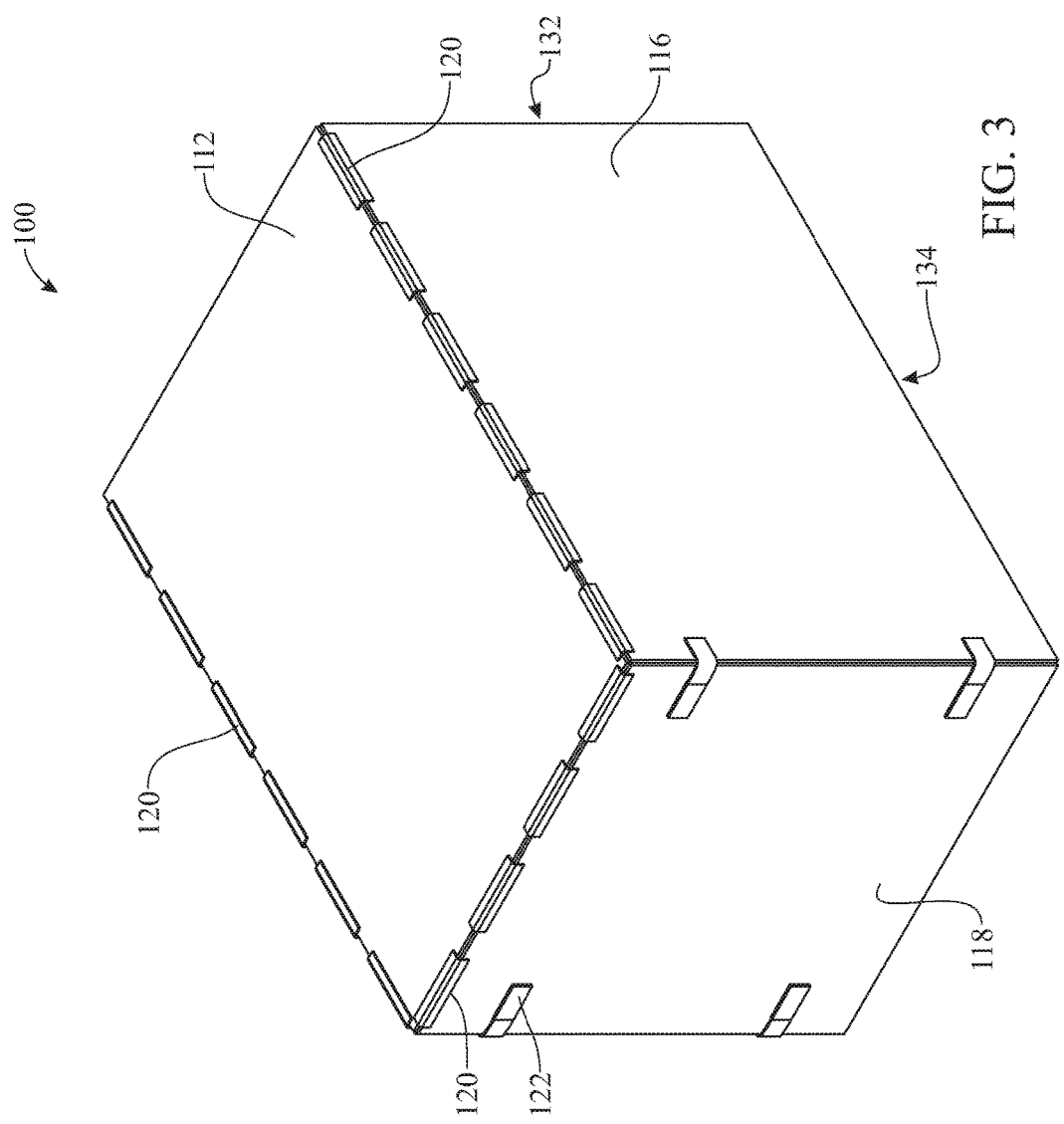
FIG. 3 presents an isometric view of the crate cover, shown folded and with the side fasteners fastened.

Referring now to FIGS. 2 and 3, the foldable crate cover 100 of FIG. 1 is shown folded and with the side fasteners formed by the first hook-and-loop components 122 and the corresponding second hook-and-loop components 124 unfastened (FIG. 2) and fastened (FIG. 3) respectively. As understood from FIGS. 1-3, because the side panels 114, 116 and back panel 118 extend from opposite left and right sides 113a and from the rear side 113b of the top panel 112, when the foldable crate cover 100 is arranged in the folded configuration of FIGS. 2 and 3, a front opening 132 and bottom opening 134 are formed in the foldable crate cover 100. The front opening 132 and bottom opening 134, more clearly visible in FIG. 4, are communicated with and provide access to the inner space 130 defined by the foldable crate cover 100 in the folded configuration.

Figure 4:
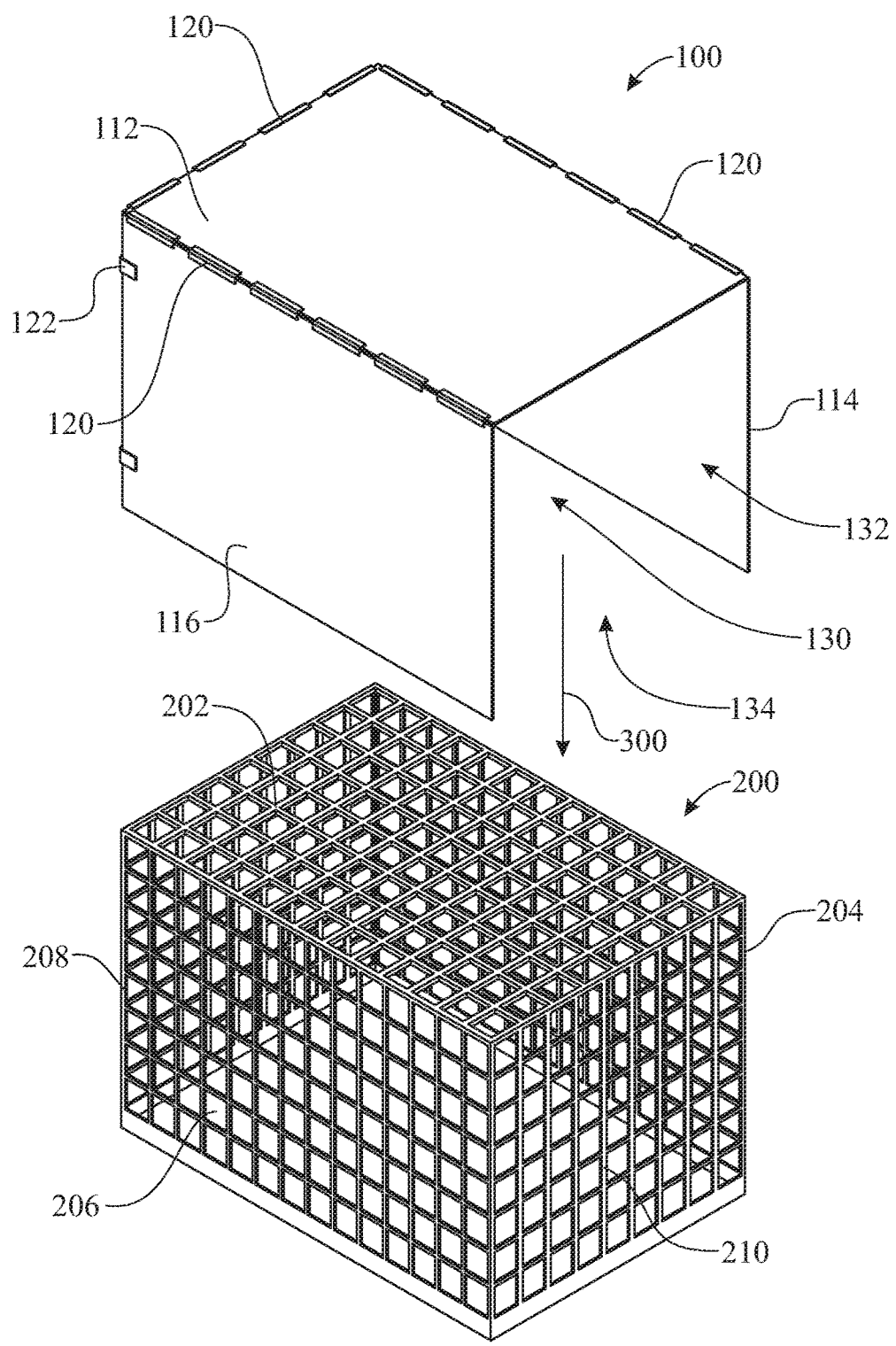
FIG. 4 presents an isometric view of the crate cover, being fitted onto an animal crate.

The illustration of FIG. 4 shows the foldable crate cover 100 of FIG. 1 in operation, being fitted onto a pet or animal crate 200 such as a wire animal crate. As shown, the animal crate 200 includes a top side 202, left and right sides 204 and 206, a back side 208 and a front side 210. As mentioned heretofore, the panels 112, 114, 116 and 118 of the foldable crate cover 100 has been folded along the hinge sections 120 to form a three-dimensional body comprising the aforementioned inner space 130, front opening 132 and bottom opening 134. Preferably, the bottom opening 134 is shaped and sized to allow the animal crate 200 to be inserted through the bottom opening 134 and into the inner space 130. Thus, the foldable crate cover 100 can be easily attached to and removed from the animal crate 200 by simply fitting the foldable crate cover 100 over and onto the animal crate 200 as indicated by arrow 300, without having to lift the animal crate 200 or carry out any other actions which may disturb an animal housed inside the animal crate 200. Similarly, the animal crate 200 could also be removed from the inner space 130 and through the bottom opening 134, by simply lifting the foldable crate cover 100.

Figure 5:
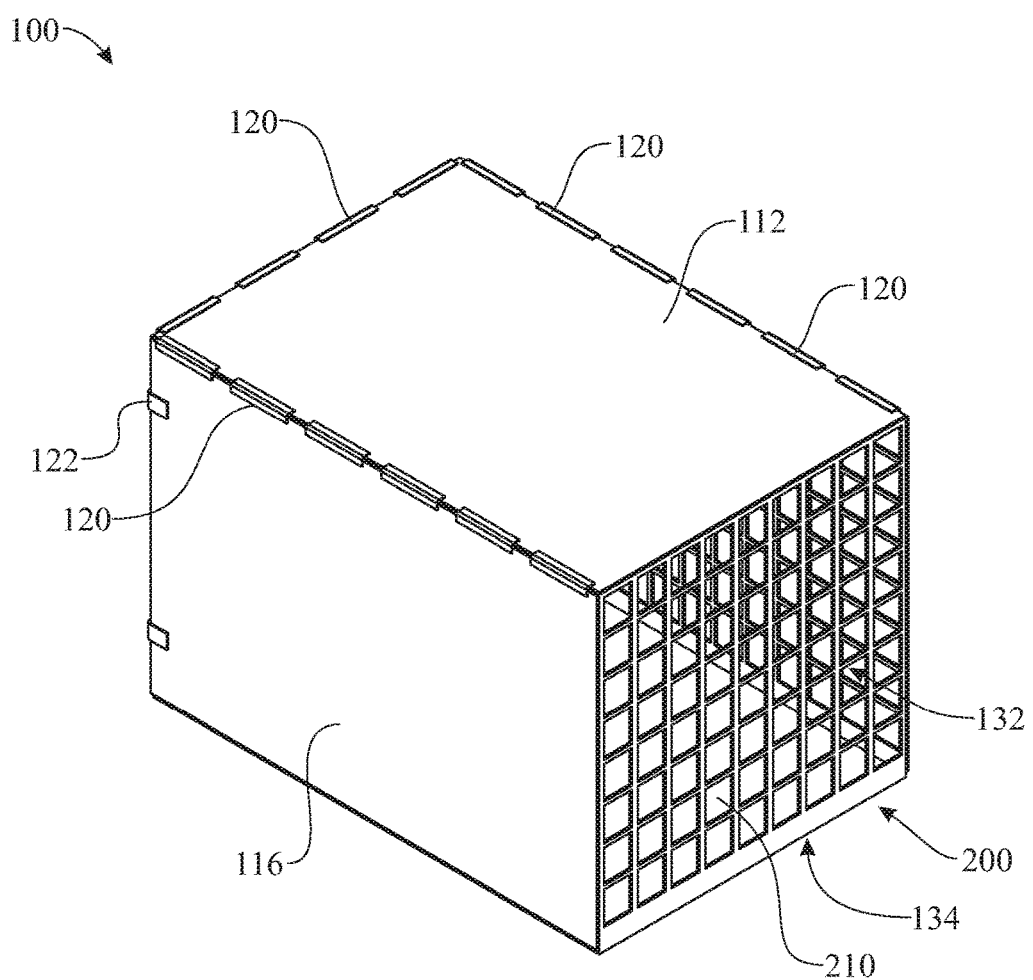
FIG. 5 presents an isometric view of the crate cover and animal crate of FIG. 4, shown in a final position in which the crate cover is fitted over and onto the animal crate.

The animal crate 200 is housed within the inner space 130 at least partially, and preferably in its entirety. The illustration of FIG. 5 shows the crate cover 100 and animal crate 200 of FIG. 4 in a final position in which the crate cover 100 is fitted over and onto the animal crate 200 and the side panels 114 and 116 of the crate cover 100 are attached to the back panel 118 of the crate cover 100 by hook-and-loop components 122 and 124. As shown, the top panel 112 of the crate cover 100 covers the top side 202 of the animal crate 200, the side panels 114 and 116 of the crate cover 100 cover the left and right sides 204 and 206 of the animal crate 200 respectively, and the back panel 118 of the crate cover 100 covers the back side 208 of the animal crate 200. In the present embodiment, the front side 210 of the animal crate 200 remains facing the front opening 132 of the folded crate cover 100 and thus remains uncovered, allowing the pet to safely observe the outside of the animal crate 200, and also providing access to a door or other closure (not shown) which, in some embodiments, may be comprised in the front side 210 of the animal crate 200. Furthermore, in some embodiments such as the depicted embodiment, the front opening 132 may be sufficiently large to allow the animal crate 200 to be fitted into the inner space 130 through the front opening 132, instead of through the bottom opening 134 as described heretofore, further facilitating mounting the crate cover 100 onto the animal crate 200. Similarly, the animal crate 200 could also be removed from the inner space 130 and through the front opening 132.

Should any one of the panels 112, 114, 116, and 118 be provided decorative elements, the decorative elements are preferably arranged on an outer face thereof, so that they are visible when the foldable cover is arranged in the folded configuration shown in FIG. 3 and placed over the animal crate 200 as shown in FIG. 4.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An animal crate and crate cover assembly, comprising:
an animal crate for housing an animal therein, the crate comprising a top side, a left side, a right side, a front side and a back side;
a foldable crate cover, comprising:
a panel assembly including a top panel for covering the top side of the animal crate at least partially, two side panels for covering the left and right sides of the animal crate at least partially, and a back panel for covering the back side of the animal crate at least partially, wherein
the top panel, side panels and back panel are flat panels, and wherein
the two side panels and the back panel are foldably connected and in material continuation to the top panel at respective hinge sections, wherein the respective hinge sections comprise a scored fold line between each respective panel, wherein the two side panels and the back panel are foldable relative to the top panel about the respective hinge sections independently to one another; and wherein the foldable crate cover can adopt a folded configuration in which the two side panels and back panel are folded relative to the top panel to define an inner space for receiving the animal crate therein.

2. The assembly of claim 1, wherein, in the folded configuration, the foldable crate cover comprises a front opening and a bottom opening in communication with the inner space.

3. The assembly of claim 2, wherein the bottom opening is configured to allow the insertion and removal of the animal crate therethrough, into and from the inner space, respectively.

4. The assembly of claim 2, wherein the front opening is configured to allow the insertion and removal of the animal crate therethrough, into and from the inner space, respectively.

5. The assembly of claim 1, wherein the foldable crate cover can further adopt a flat configuration in which the two side panels, the back panel and the top panel are arranged coplanar to one another.

6. The assembly of claim 1, wherein the respective hinge sections at which the two side panels and the back panel are foldably connected to the top panel are arranged at opposite left and right sides and a rear side of the top panel, respectively.

7. The assembly of claim 1, further comprising at least one fastener for securing at least one of the side panels of the panel assembly to the back panel of the panel assembly when the foldable crate cover is arranged in the folded configuration.

8. The assembly of claim 7, wherein the at least one fastener can be selectively and reversibly fastened and unfastened.

9. The assembly of claim 7, wherein the at least one fastener comprises a first fastener portion carried by the at least one of the side panels and a second fastener portion carried by the back panel, the first and second fastener portions configured to fasten to one another when the foldable crate cover is arranged in the folded configuration.

10. The assembly of claim 9, wherein the first and second fastener portions are mating hook and loop portions of a hook-and-loop fastener.

11. The assembly of claim 1, wherein the two side panels of the panel assembly comprise one or more fasteners configured to fasten to corresponding one or more fasteners on the back panel of the panel assembly when the foldable crate cover is arranged in the folded configuration.

12. The assembly of claim 1, wherein any one of the side panels and back panel is made of plastic, wood, cardboard, lightweight metal or combinations thereof.

13. The assembly of claim 1, wherein any one of the side panels and back panel comprises a decorative element visible from outside the foldable crate cover when the foldable crate cover is arranged in the folded configuration.

14. The assembly of claim 1, wherein the animal crate is a wire crate.

15. An animal crate and crate cover assembly, comprising:
an animal crate for housing an animal therein, the crate comprising a top side, a left side, a right side, a front side and a back side;
a foldable crate cover, comprising:

a panel assembly including a top panel for covering the top side of the animal crate at least partially, two side panels for covering the left and right sides of the animal crate at least partially, and a back panel for covering the back side of the animal crate at least partially, wherein the top panel, side panels and back panel are flat panels, and wherein the two side panels and the back panel are foldably connected and in material continuation to the top panel at respective hinge sections, wherein the respective hinge sections comprise a scored fold line between each respective panel, wherein the two side panels and the back panel are foldable relative to the top panel about the hinge section independently to one another; wherein the foldable crate cover can adopt a folded configuration in which the two side panels and back panel are folded relative to the top panel to define an inner space for receiving the animal crate therein, and in which the foldable crate cover comprises a front opening and a bottom opening in communication with the inner space, wherein the bottom opening is configured to allow the insertion and removal of the animal crate therethrough, into and from the inner space, respectively; and further wherein the foldable crate cover can further adopt a flat configuration in which the two side panels, the back panel and the top panel are arranged coplanar to one another.

16. An animal crate and crate cover assembly, comprising:
an animal crate for housing an animal therein, the crate comprising a top side, a left side, a right side, a front side and a back side;
a foldable crate cover, comprising:

a panel assembly including a top panel for covering the top side of the animal crate at least partially, two side panels for covering the left and right sides of the animal crate at least partially, and a back panel for covering the back side of the animal crate at least partially, and at least one fastener, wherein the top panel, side panels and back panel are flat panels, and wherein the two side panels and the back panel are foldably connected and in material continuation to the top panel at respective hinge sections, wherein the respective hinge sections comprise a scored fold line between each respective panel, wherein the two side panels and the back panel are foldable relative to the top panel about the respective hinge sections independently to one another; wherein the foldable crate cover can adopt a folded configuration in which:
the two side panels and back panel are folded relative to the top panel to define an inner space for receiving the animal crate therein, the at least one fastener secures at least one of the side panels of the panel assembly to the back panel of the panel assembly, and the foldable crate cover defines a front opening and a bottom opening in communication with the inner space, wherein the bottom opening is configured to allow the insertion and removal of the animal crate therethrough, into and from the inner space, respectively; and further wherein the foldable crate cover can further adopt a flat configuration in which the two side panels, the back panel and the top panel are arranged coplanar to one another.

\* \* \* \* \*